(12) United States Patent
Suzuki et al.

(10) Patent No.: US 9,618,323 B2
(45) Date of Patent: Apr. 11, 2017

(54) METHOD FOR MANUFACTURING OPTICAL INTERFEROMETER

(71) Applicant: HAMAMATSU PHOTONICS K.K., Hamamatsu-shi, Shizuoka (JP)

(72) Inventors: Tomofumi Suzuki, Hamamatsu (JP); Yoshihisa Warashina, Hamamatsu (JP); Kohei Kasamori, Hamamatsu (JP); Tatsuya Sugimoto, Hamamatsu (JP); Jo Ito, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 14/911,583

(22) PCT Filed: Jul. 31, 2014

(86) PCT No.: PCT/JP2014/070219
§ 371 (c)(1),
(2) Date: Feb. 11, 2016

(87) PCT Pub. No.: WO2015/025691
PCT Pub. Date: Feb. 26, 2015

(65) Prior Publication Data
US 2016/0202037 A1 Jul. 14, 2016

(30) Foreign Application Priority Data
Aug. 19, 2013 (JP) .................................. 2013-169479

(51) Int. Cl.
*G01B 9/02* (2006.01)
*G01J 3/02* (2006.01)
*G01J 3/453* (2006.01)

(52) U.S. Cl.
CPC ........ *G01B 9/02051* (2013.01); *G01J 3/0256* (2013.01); *G01J 3/4532* (2013.01); *G01J 3/4535* (2013.01)

(58) Field of Classification Search
None
See application file for complete search history.

(56) References Cited

U.S. PATENT DOCUMENTS

| 2008/0080034 A1* | 4/2008 | Saadany | G01J 3/02 359/223.1 |
| 2014/0104687 A1* | 4/2014 | Warashina | G01B 9/02051 359/580 |

(Continued)

FOREIGN PATENT DOCUMENTS

| CN | 1755502 | 4/2006 |
| CN | 102834764 | 12/2012 |

(Continued)

OTHER PUBLICATIONS

International Preliminary Report on Patentability dated Mar. 3, 2016 for PCT/JP2014/070219.

*Primary Examiner* — Shamim Ahmed
(74) *Attorney, Agent, or Firm* — Drinker Biddle & Reath LLP

(57) ABSTRACT

A method of manufacturing an optical interferometer includes a first step of forming a first semiconductor portion for a beam splitter and a second semiconductor portion for a movable mirror on a main surface of a support substrate and a first insulating layer formed on the main surface, a second step of disposing a first wall portion between a first side surface of the first semiconductor portion and a second side surface in the second semiconductor portion, and a third step of forming a mirror surface in the second semiconductor portion by forming a first metal film on the second side surface using a shadow mask. In the third step, the first side (Continued)

surface is masked by the mask portion and the first wall portion and the first metal film is formed in a state in which the second side portion is exposed from an opening portion.

6 Claims, 10 Drawing Sheets

(56) References Cited

U.S. PATENT DOCUMENTS

| | | | |
|---|---|---|---|
| 2014/0139924 A1* | 5/2014 | Warashina | G02B 26/001 359/578 |
| 2014/0192365 A1* | 7/2014 | Mortada | G01B 9/02015 356/521 |

FOREIGN PATENT DOCUMENTS

| | | |
|---|---|---|
| EP | 1 906 159 | 4/2008 |
| JP | 2006-095682 A | 4/2006 |
| JP | 2006-332256 A | 12/2006 |
| JP | 2008-102132 A | 5/2008 |
| JP | 2012-242450 A | 12/2012 |
| WO | WO-2011/112676 A1 | 9/2011 |

* cited by examiner

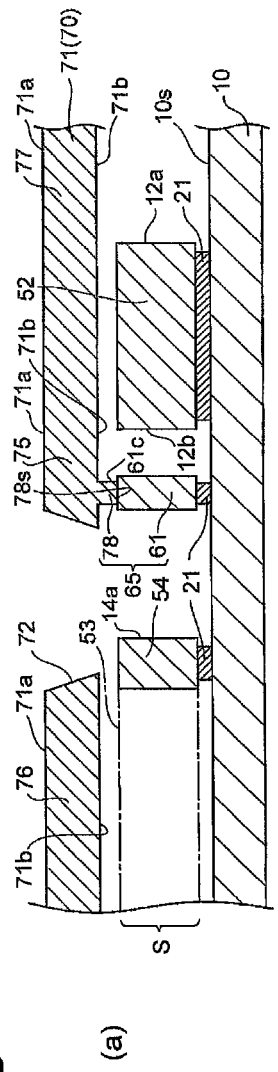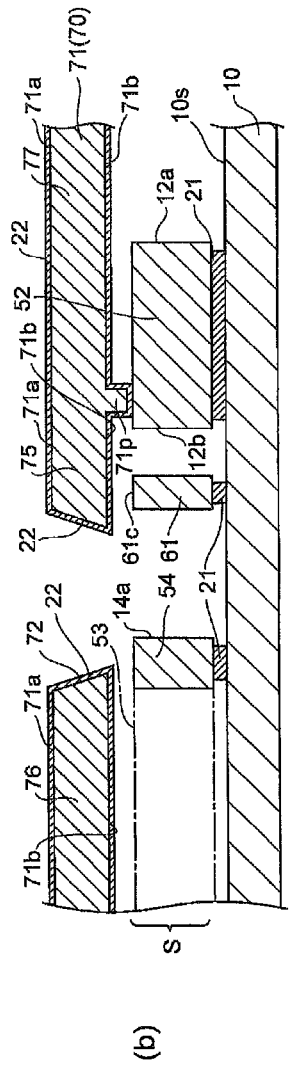
Fig. 9

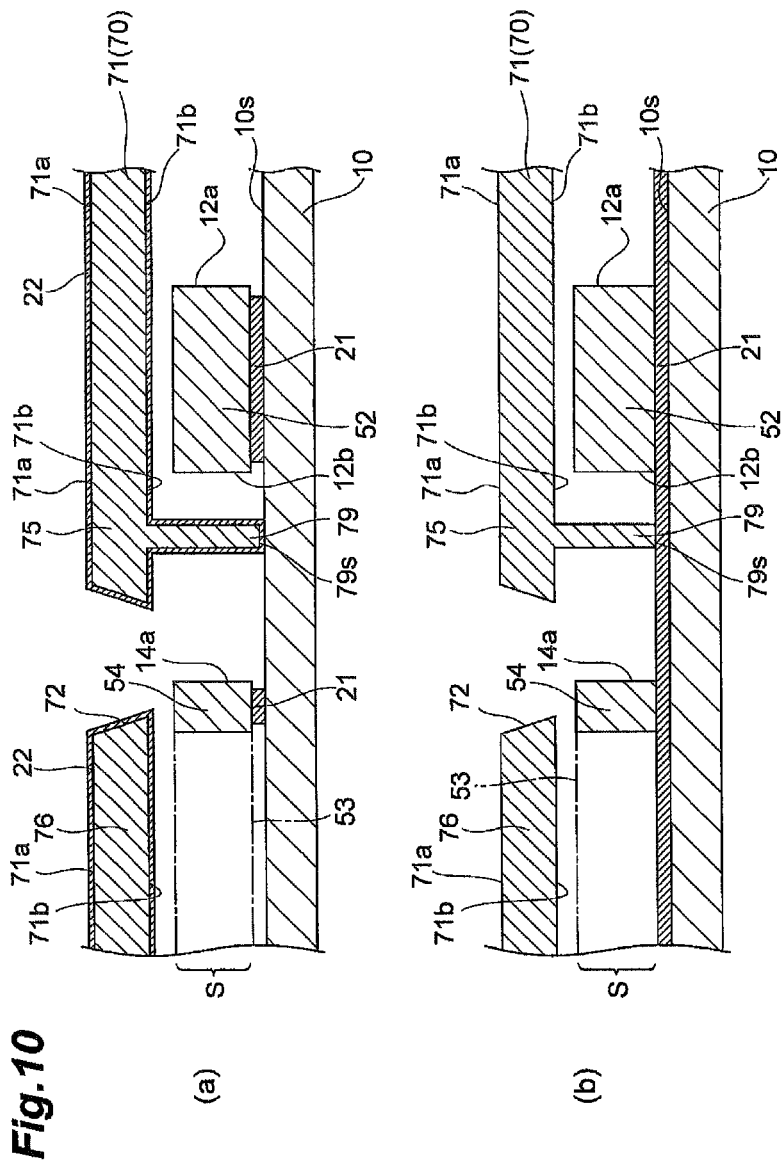

METHOD FOR MANUFACTURING OPTICAL INTERFEROMETER

TECHNICAL FIELD

An aspect of the present invention relates to a method of manufacturing an optical interferometer using MEMS technology.

BACKGROUND ART

In Patent Literature 1, a micro-machined interferometer is disclosed. This interferometer includes optical components such as a beam splitter, an electrostatic actuator, a movable mirror movable by the electrostatic actuator, and a fixed mirror. In addition, a method of manufacturing such an interferometer is disclosed in Patent Literature 1. In this manufacturing method, a portion serving as each optical component is formed on an insulating layer by etching a silicon layer of an SOI wafer. In addition, in this manufacturing method, metal coating is selectively performed on a portion formed of a movable mirror or a fixed mirror through sputtering using a shadow mask.

CITATION LIST

Patent Literature

[Patent Literature 1] Japanese Unexamined Patent Publication No. 2008-102132

SUMMARY OF INVENTION

Technical Problem

As described above, it is necessary to increase a distance between a portion serving as the movable mirror and a portion serving as the beam splitter, for example, to prevent metal coating from being performed on the portion serving as the beam splitter, for example, when the metal coating is selectively performed on the portion serving as the movable mirror, through the sputtering using the shadow mask. As a result, the distance between the beam splitter and the movable mirror increases and an optical path length in the interferometer is extended by the increase. When the optical path length is enlarged, the enlargement of a beam diameter in the interferometer becomes remarkable and optical use efficiency is degraded.

Therefore, an objective of an aspect of the present invention is to provide a method of manufacturing an optical interferometer capable of suppressing the degradation of optical use efficiency due to an extension of an optical path length.

Solution to Problem

According to an aspect of the present invention, there is provided a method of manufacturing an optical interferometer, the method including: a first step of forming a first semiconductor portion for a beam splitter and a second semiconductor portion for a movable mirror on a main surface of a support substrate formed of silicon and a first insulating layer formed on the main surface; a second step of disposing a first wall portion extending along the main surface between a first side surface of the first semiconductor portion at the side of the second semiconductor portion and a second side surface of the second semiconductor portion at the side of the first semiconductor portion; a third step of forming a mirror surface in the second semiconductor portion by forming a first metal film on the second side surface using a shadow mask; and a fourth step of removing the first wall portion after the third step, wherein the shadow mask has a mask portion and a first opening portion provided in the mask portion, and wherein the first side surface is masked by the mask portion and the first wall portion and the first metal film is formed in a state in which the second side portion is exposed from the first opening portion in the third step.

In this method, the first wall portion is arranged between the first semiconductor portion for the beam splitter and the second semiconductor portion for the movable mirror. The metal film is formed on the second side surface of the second semiconductor portion using the shadow mask. When the metal film is formed, the first side surface is masked using the first wall portion while the second side surface is exposed from the first opening portion of the shadow mask. Thus, even when the first semiconductor portion is close to the second semiconductor portion, it is possible to form a mirror surface by forming the metal film on the second side surface while preventing the metal film from being formed on the first side surface. Accordingly, because the beam splitter and the movable mirror can be formed to be close to each other, the extension of the optical path length in the optical interferometer can be suppressed. Consequently, the optical interferometer capable of suppressing the degradation of optical use efficiency due to the extension of the optical path length can be manufactured.

In the method of manufacturing the optical interferometer according to the aspect of the present invention, the first and second semiconductor portions may be formed by etching a semiconductor layer formed on the main surface and the first insulating layer in the first step and the second step may be performed by forming the first wall portion on the main surface and the first insulating layer by the etching. In this case, the first and second semiconductor portions and the first wall portion can be collectively formed. In addition, the first wall portion can also be removed when the first insulating layer is etched to form a hollow structure such as a movable mirror.

In the method of manufacturing the optical interferometer according to the aspect of the present invention, the first side surface may be masked by the mask portion and the first wall portion by joining a back surface of the mask portion to a top portion of the first wall portion in the third step. In this case, the first side surface is reliably masked.

In the method of manufacturing the optical interferometer according to the aspect of the present invention, the second wall portion extending along the back surface may be formed on the back surface of the mask portion, and a bottom portion of the second wall portion may be joined to the top portion of the first wall portion in the third step. In this case, the first wall portion formed on the main surface of the support substrate and the second wall portion formed on the shadow mask can be used in the mask of the first side surface. Thus, it is possible to suppress the height of the wall portion for use in the mask of the first side surface as compared with when the wall portion is formed on any one of the main surface of the support substrate and the shadow mask. Consequently, the formation of the wall portion is facilitated, In the method of manufacturing the optical interferometer according to the aspect of the present invention, a second insulating layer may be formed on the back surface of the mask portion, and the back surface of the mask portion may be joined to the top portion of the first wall portion through the second insulating layer in the third step. In this case, the shadow mask can be easily removed by etching the second insulating layer. In particular, when the first insulating layer and the second insulating layer can be etched by the same etching agent, it is possible to simultaneously perform the formation of a hollow structure such as the movable mirror, the removal of the first wall portion, and the removal of the shadow mask through one etching process on the first and second insulating layers.

In the method of manufacturing the optical interferometer according to the aspect of the present invention, a third semiconductor portion for a deflection minor may be formed on the main surface and the first insulating layer in the first step, a third wall portion extending along the main surface may be disposed between a third side surface of the third semiconductor portion at the side of the first semiconductor portion and the first semiconductor potion may be arranged in the second step, a minor surface may be formed in the third semiconductor portion by forming a second metal film on the third side surface using the shadow mask in the third step, the shadow mask may have a second opening portion formed in the mask portion, and a side surface of the first semiconductor portion at the side of the third semiconductor potion may be masked by the mask portion and the third wall portion and the second metal film may be formed in a state in which the third side surface is exposed from the second opening portion in the third step. In this case, for a reason similar to that described above, it is possible to further suppress the extension of the optical path length because the beam splitter and the deflection mirror can be formed to be close to each other.

Advantageous Effects of Invention

According to an aspect of the present invention, it is possible to provide a method of manufacturing an optical interferometer capable of suppressing the degradation of optical use efficiency due to an extension of an optical path length.

BRIEF DESCRIPTION OF DRAWINGS

FIG. 9 is a schematic end view illustrating a modified example of a shadow mask illustrated in FIG. 3.

FIG. 10 is a schematic end view illustrating a modified example of the shadow mask illustrated in FIG. 3.

EMBODIMENTS

Hereinafter, an embodiment of a method of manufacturing an optical interferometer will be described in detail with reference to the drawings. Also, the same or corresponding elements are assigned the same reference signs in the description of the drawings and redundant description thereof will be omitted.

Figure 1:
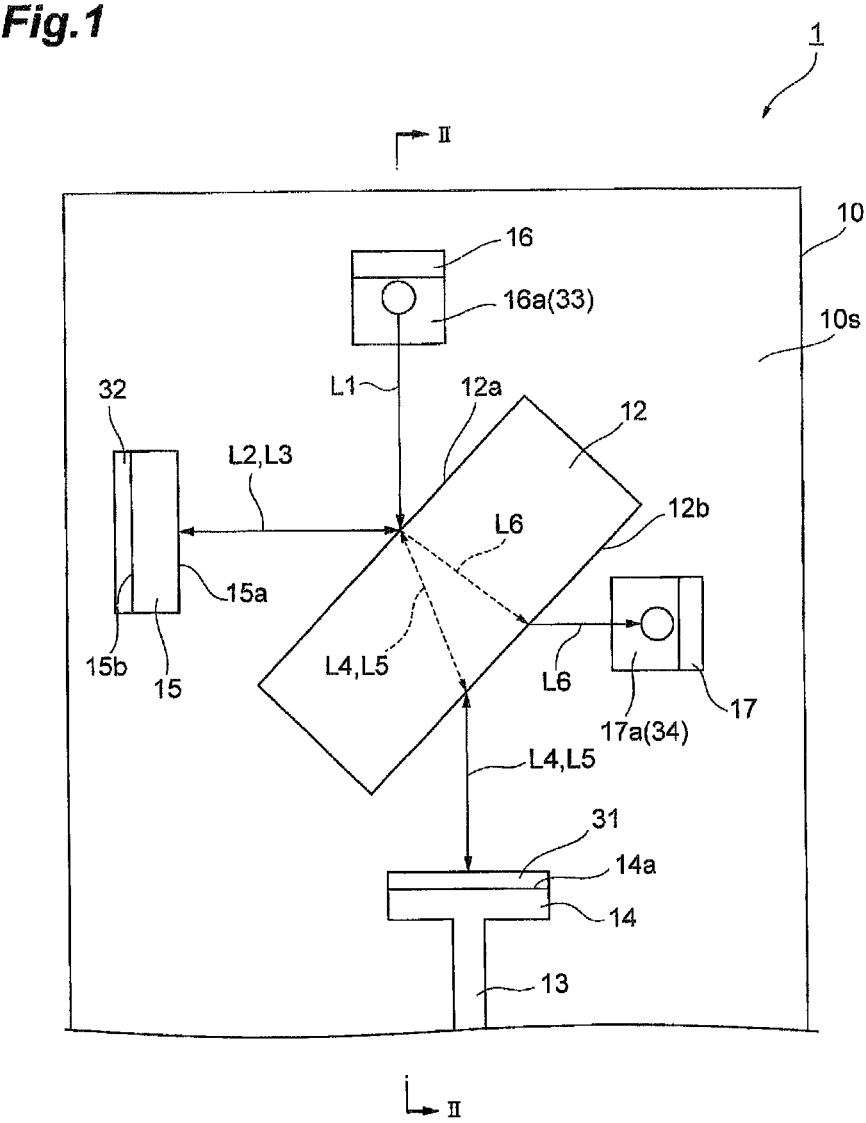
FIG. 1 is a schematic plan view of an optical interferometer to be manufactured by a method according to the present embodiment.
Figure 2:
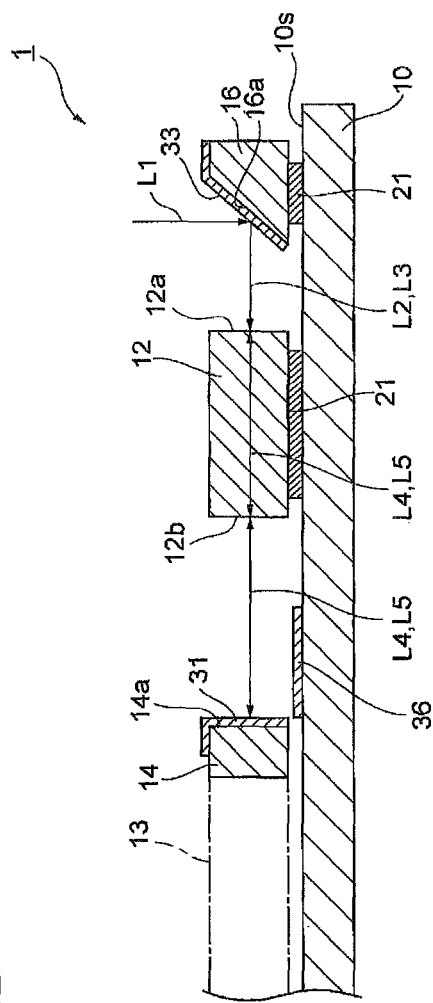
FIG. 2 is a schematic end view taken along line II-II of FIG. 1.

FIG. 1 is a schematic plan view of an optical interferometer to be manufactured by a method according to the present embodiment. FIG. 2 is a schematic end view taken along line II-II of FIG. 1. An optical interferometer 1 illustrated in FIGS. 1 and 2 is an optical interferometer using MEMS technology, and, for example, is configured as a Michelson interferometer. The optical interferometer 1 includes a support substrate 10, a beam splitter 12, an actuator 13, a movable mirror 14, a fixed mirror 15, and deflection mirrors 16 and 17.

The support substrate 10 has a main surface 10s. The support substrate 10 is formed of, for example, silicon. The support substrate 10, for example, is a silicon substrate in an SOI substrate. An insulating layer (first insulating layer) 21 is formed in a region of a part of the main surface 10s. The insulating layer 21, for example, is formed by etching an insulating layer (sacrificial layer) of the SOI substrate. The insulating layer 21 is formed of, for example, a silicon oxide (for example, $SiO_2$) or a silicon nitride (for example, SiN).

The beam splitter 12, the actuator 13, the movable mirror 14, the fixed mirror 15, and the deflection mirrors 16 and 17, for example, are formed on the main surface 10s of the support substrate 10 through etching or the like of the silicon layer of the SOI substrate. In addition, for example, the beam splitter 12, the fixed mirror 15, and the deflection mirrors 16 and 17 are formed on the main surface 10s and the insulating layer 21 (that is, the insulating layer 21 is interposed between them and the main surface 10s). On the other hand, a part of the actuator 13 and the movable mirror 14 float over the main surface 10s (that is, the insulating layer 21 is not interposed between them and the main surface 10s) and have a hollow structure.

The beam splitter 12 is a light transmission component which transmits light of a predetermined wavelength. The beam splitter 12 has a side surface 12a and a side surface (first side surface) 12b opposite to the side surface 12a. The side surfaces 12a and 12b extend in a direction along the main surface 10s and a direction orthogonal to the main surface 10s. The side surface 12a is a surface at the side of the deflection mirror 16 (in particular, a side surface 16a to be described below) and the side surface 12b is a surface at the side of the movable mirror 14 (in particular, a side surface 14a to be described below).

The side surface 12a is a half-mirror surface (semi-transmission/reflection surface) which reflects some of arriving light and transmits the remainder. For example, a silicon oxide film, a silicon nitride film, etc. can be formed on the side surface 12a. The side surface 12b is a light transmission surface. For example, an anti-reflection film (AR film) including a silicon nitride film can be formed on the side surface 12b.

The actuator 13 includes a comb-tooth portion formed in a comb-tooth shape, a support portion for supporting the comb-tooth portion on the main surface 10s, and another comb-tooth portion formed in a comb-tooth shape to be arranged between comb teeth of the comb-tooth portion (the illustration of each portion is omitted). No insulating layer is interposed between the comb-tooth portion and the main surface 10s, and the comb-tooth portion is supported by the support portion in a state in which the comb-tooth portion floats over the main surface 10s. The actuator 13 is configured to change (control) a space between comb teeth in a direction along the main surface 10s by causing an electrostatic force between the comb-tooth portion and the other comb-tooth portion. Thus, an electrode (not illustrated) for applying a voltage is formed in the actuator 13.

The movable mirror 14 has a side surface (second side surface) 14a. The side surface 14a is a surface at the side of a side surface 12b of the beam splitter 12, The side surface 14a extends in a direction along the main surface 10s and a direction orthogonal to the main surface 10s. A metal film (first metal film) 31 is formed on the side surface 14a. Thereby, the side surface 14a is configured as a mirror surface (reflection surface) which totally reflects arriving light.

The movable mirror 14 is connected to one end portion of the actuator 13. In addition, no insulating layer 21 is interposed between the movable mirror 14 and the main surface 10s and the movable mirror 14 floats over the main surface 10s. Accordingly, the movable mirror 14 is movable by the actuator 13 in the direction along the main surface 10s.

The fixed mirror 15 has a pair of side surfaces 15a and 15b opposite to each other. The side surfaces 15a and 15b extend in the direction along the main surface 10s and extend in the direction approximately orthogonal to the main surface 10s. The side surface 15a is a surface at the side of the side surface 12a of the beam splitter 12 and the side surface 15b is a surface opposite to the side surface 15a. A metal film 32 is formed on the side surface 15b. Thereby, the side surface 15b is configured as a mirror surface which totally reflects arriving light.

The deflection mirror 16 has a side surface 16a. The side surface 16a is a surface at the side of the side surface 12a of the beam splitter 12. The side surface 16a extends in the direction along the main surface 10s and a direction tilted 45 degrees with respect to a direction orthogonal to the main surface 10s. A metal film (second metal film) 33 is formed on the side surface 16a. Thereby, the side surface 16a is configured as a mirror surface which totally reflects arriving light. The deflection mirror 16, for example, is an incident mirror, and is a 90-degree deflection mirror which deflects light incident from the direction orthogonal to the main surface 10s in the direction along the main surface 10s. The side surface 12a of the beam splitter 12 is tilted with respect to an optical path of light deflected by the deflection mirror 16 when viewed from the direction orthogonal to the main surface 10s.

The deflection mirror 17 has a side surface 17a. The side surface 17a is a surface of the beam splitter 12 at the side of the side surface 12b. The side surface 17a extends in the direction along the main surface 10s and the direction tilted 45 degrees with respect to the direction orthogonal to the main surface 10s. A metal film (second metal film) 34 is formed on the side surface 17a. Thereby, the side surface 17a is configured as a mirror surface which totally reflects arriving light. The deflection mirror 17, for example, is an emission mirror, and is a 90-degree deflection mirror which deflects light from a direction along the main surface 10s in the direction orthogonal to the main surface 10s.

In the optical interferometer 1 as described above, light L1 incident on the optical interferometer 1 is deflected 90 degrees by the side surface 16a of the deflection mirror 16 and incident on the side surface 12a of the beam splitter 12. Light L2, which is some of the light L1 incident on the side surface 12a, is reflected by the side surface 12a, incident on the fixed mirror 15 from the side surface 15a, and reflected by the side surface 15b. Light L3 reflected by the side surface 15b is incident on the side surface 12a of the beam splitter 12 again.

On the other hand, light L4, which is the remainder of the light L1 incident on the side surface 12a, is transmitted through the side surface 12a, emitted from the side surface 12b, and reflected by the side surface 14a of the movable mirror 14. Light L5 reflected by the side surface 14a is incident on the side surface 12b again and reaches the side surface 12a. The light L5 reflected by the side surface 14a and reaching the side surface 12a is combined with the light L3 which is reflected by the fixed mirror 15 and is incident on the side surface 12a, and emitted as interference light L6 from the side surface 12b. The interference light L6 emitted from the side surface 12b is deflected 90 degrees in the direction orthogonal to the main surface 10s by the side surface 17a of the deflection mirror 17 and output outside the optical interferometer 1.

Figure 3:
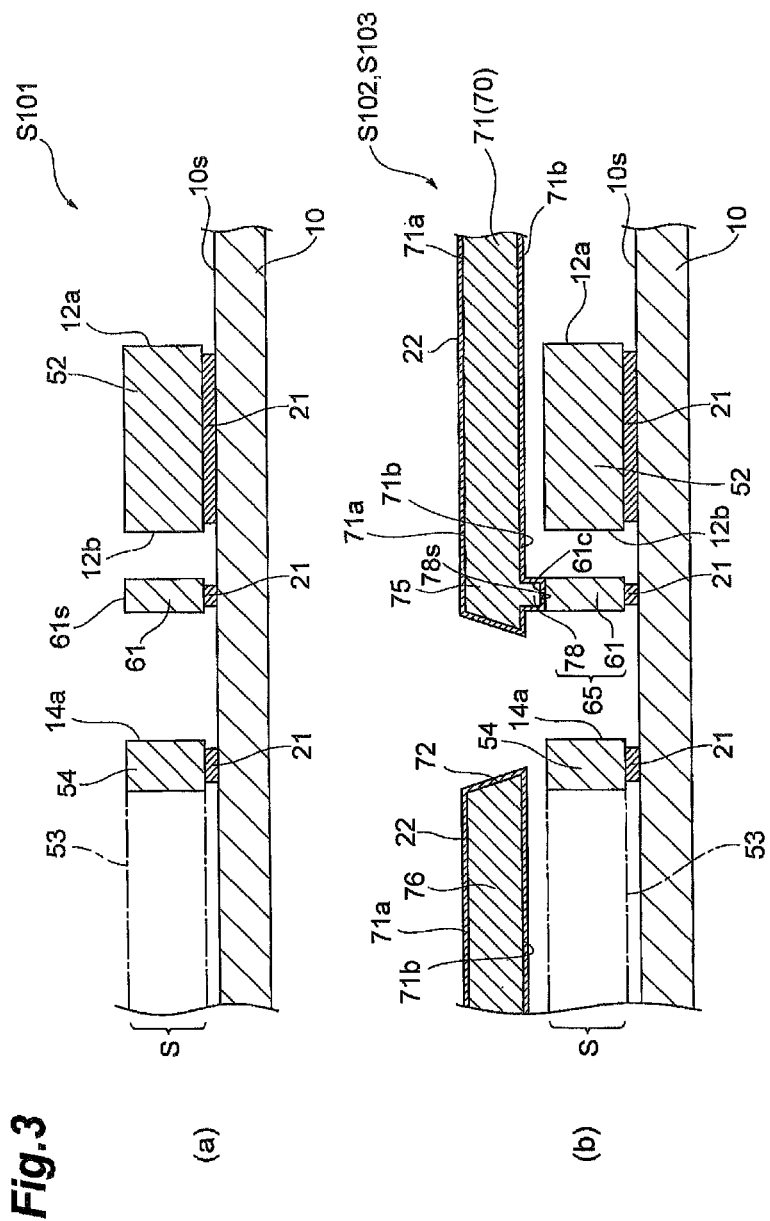
FIG. 3 is a schematic end view illustrating main steps of a method of manufacturing the optical interferometer according to the present embodiment.
Figure 4:
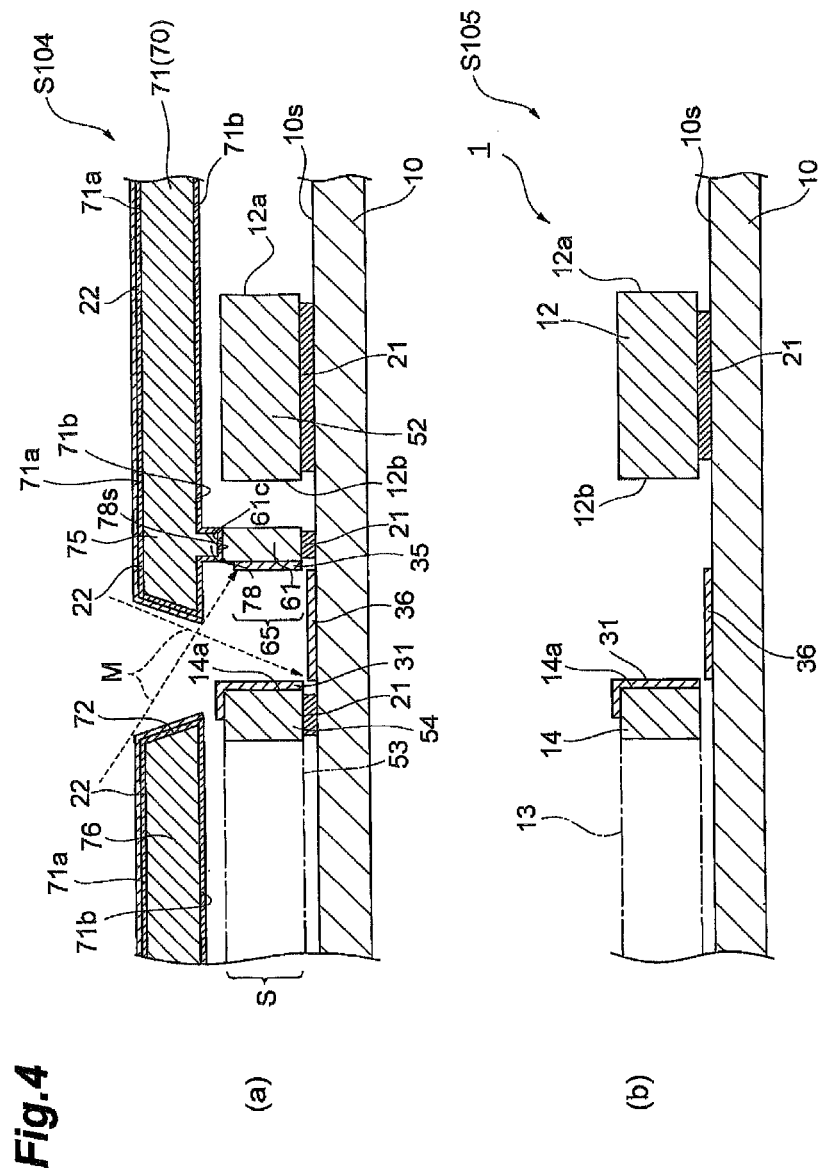
FIG. 4 is a schematic end view illustrating main steps of the method of manufacturing the optical interferometer according to the present embodiment.
Figure 5:
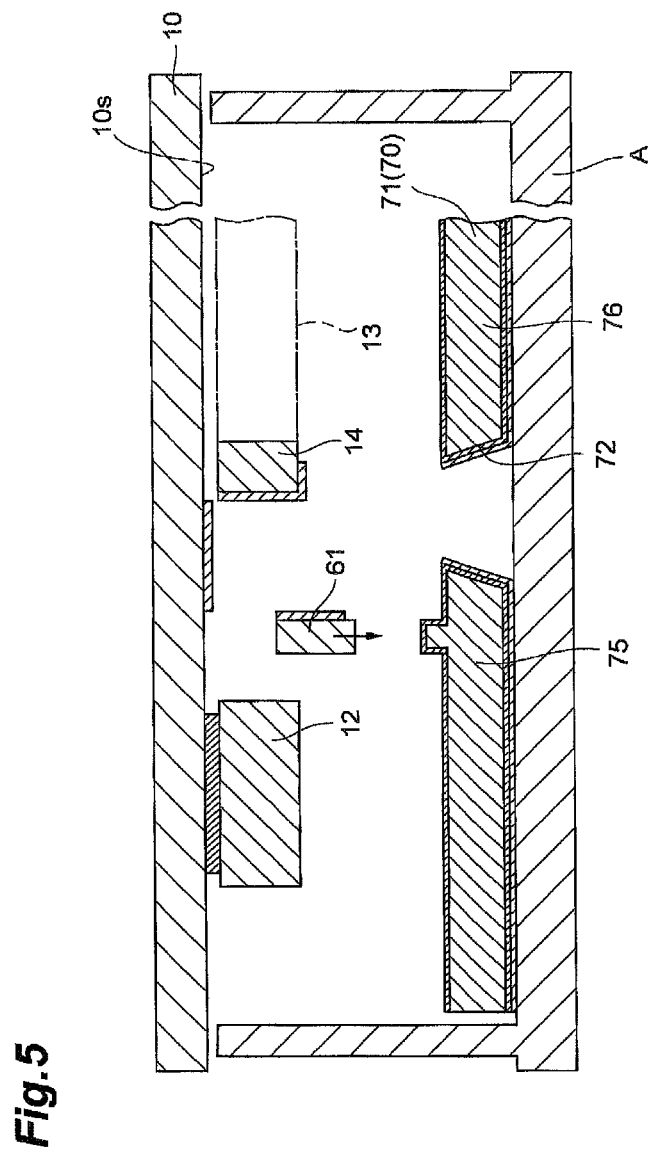
FIG. 5 is a schematic end view illustrating main steps of the method of manufacturing the optical interferometer according to the present embodiment.

Next, a method of manufacturing the optical interferometer 1 will be described. FIGS. 3 to 5 are schematic end views illustrating main steps of the method of manufacturing the optical interferometer according to the present embodiment. For this method, a substrate formed by layering a semiconductor layer through an insulating layer (sacrificial layer: first insulating layer) on the main surface 10s of the support substrate 10 is first provided. This substrate, for example, is an SOI substrate. The insulating layer is formed of, for example, a silicon oxide (for example, $SiO_2$) or a silicon nitride (for example, SiN). The semiconductor layer is formed of, for example, silicon.

Subsequently, a semiconductor portion (first semiconductor portion) 52 for the beam splitter 12, a semiconductor portion 53 for the actuator 13, and a semiconductor portion (second semiconductor portion) 54 for the movable mirror 14 are formed as illustrated in FIG. 3(a) by etching the semiconductor layer formed on the main surface 10s and the insulating layer (step S101: first and second steps). In addition, the insulating layer 21 is formed by removing a part of the insulating layer. Thereby, a semiconductor layer S including the semiconductor portions 52 to 54 is formed on the main surface 10s and the insulating layer 21. The semiconductor portion 52 includes the side surfaces 12a and 12b and the semiconductor portion 54 includes the side surface 14a.

In addition, in step S101, an insulating layer between a region for a movable portion including a comb-tooth portion of the semiconductor portion 53 and the main surface 10s is removed by removing a part of the insulating layer and forming the insulating layer 21, and these float over the main surface 10s (that is, a hollow structure is formed). The insulating layer (insulating layer 21) remains between the semiconductor portions 52 and 54 and the main surface 10s.

Further, in this step S101, the semiconductor portions 52 to 54 are formed by etching the above-described semiconductor layer and a wall portion (first wall portion) 61 is formed on the main surface 10s and the insulating layer 21 by the etching. The wall portion 61 is formed between the side surface 12b of the semiconductor portion 52 at the side of the semiconductor portion 54 and the side surface 14a of the semiconductor portion 54 at the side of the semiconductor portion 52 so that the wall portion 61 extends in the direction along the main surface 10s and the direction orthogonal to the main surface 10s. That is, in this step S101, the wall portion 61 extending along the main surface 10s is disposed between the side surface 12b of the semiconductor portion 52 and the side surface 14a of the semiconductor portion 54.

The wall portion 61 is formed at the side of the side surface 12b rather than at a center position between the side surface 12b of the semiconductor portion 52 and the side surface 14a of the semiconductor portion 54. That is, the wall portion 61 is arranged at a position closer to the semiconductor portion 52 than the semiconductor portion 54. In addition, because the wall portion 61 is formed along with the semiconductor portions 52 to 54 by etching the semiconductor layer, the height of the wall portion 61 from the main surface 10s is substantially the same as the height of the semiconductor portions 52 to 54 from the main surface 10s.

In the step (metallization step) of forming a subsequent metal film, this wall portion 61 is used to separately protect a portion such as the side surface 12b of the semiconductor portion 52 (non-metallized portion) in which a metal film is not formed from a portion such as the side surface 14a of the semiconductor portion 54 (metallized portion) in which a metal film is formed (that is, used to mask a non-metallized portion).

Also, here, for example, the semiconductor portions 52 to 54 and the wall portion 61 can be collectively formed by forming a pattern for the wall portion 61 in addition to a pattern for the semiconductor portions 52 to 54 to a mask to be used at the time of etching the semiconductor layer. The semiconductor layer S includes the wall portion 61.

Next, as illustrated in FIG. 3(b), a shadow mask 70 is provided (step S102). As the shadow mask 70, for example, a silicon wafer or a glass wafer can be used. The shadow mask 70 has a mask portion 71 and an opening portion (first opening portion) 72 formed in the mask portion 71. When the shadow mask 70 is arranged on the main surface 10s and the semiconductor layer S in a subsequent step, the mask portion 71 includes a first region 75 which covers the side surface 12b of the semiconductor portion 52 and the wall portion 61 and a second region 76 which defines the opening portion 72 with the first region 75 when viewed from the direction orthogonal to the main surface 10s.

The mask portion 71 includes a front surface 71a and a back surface 71b opposite to the front surface 71a. The back surface 71b is a surface located at the side of the main surface 10s and the semiconductor layer S rather than the front surface 71a (that is, a surface opposite to the main surface 10s) when the shadow mask 70 is arranged on the main surface 10s and the semiconductor layer S in a subsequent step. A wall portion (second wall portion) 78 extending along the back surface 71b is formed on the back surface 71b. Here, the wall portion 78 is formed for the back surface 71b in the first region 75.

In addition, an insulating layer (sacrificial layer: second insulating layer) 22 is formed on an external surface including a front surface 71a and a back surface 71b of the mask portion 71 (that is, the insulating layer 22 is also formed on the external surface of the wall portion 78). The insulating layer 22 is formed of, for example, a silicon oxide (for example, $SiO_2$) or a silicon nitride (for example, SiN). When the insulating layer 22 is formed of a silicon oxide, the insulating layer 22, for example, is formed by thermal oxidation.

Subsequently, the shadow mask 70 is arranged on the main surface 10s and the semiconductor layer S and joined to the semiconductor layer S (step S103: third step). At this time, the shadow mask 70 is arranged on the main surface 10s and the semiconductor layer S so that the side surface 12b of the semiconductor portion 52 is masked by (here, covered with) the first region 75 of the mask portion 71 and the wall portion 61 and the side surface 14a of the semiconductor portion 54 is exposed from the opening portion 72 (that is, so that the side surface 14a of the semiconductor portion 54 is included in the opening portion 72 when viewed from the direction orthogonal to the main surface 10s).

In addition, in this step S103, the shadow mask 70 is joined to the semiconductor layer S by joining a bottom portion (bottom surface) 78s of the wall portion 78 to a top portion (top surface) 61c of the wall portion 61. Because the shadow mask 70 is joined to the semiconductor layer S in a wall portion 78 protruding from the back surface 71b as described above, a major portion of the back surface 71b is separated from the semiconductor layer S.

Here, the bottom portion 78s of the wall portion 78 is joined to the top portion 61c of the wall portion 61, so that a continuous wall portion 65 extending from the main surface 10s to the back surface 71b of the mask portion 71 (more specifically, a flat portion other than the wall portion 78 on the back surface 71b) is configured by the wall portion 61 and the wall portion 78. The side surface 12b of the semiconductor portion 52 is masked using the wall portion 65. That is, here, a wall portion for masking the side surface 12b is provided on both the main surface 10s of the support substrate 10 and the shadow mask 70.

Further, as described above, the insulating layer 22 is formed on the back surface 71b of the mask portion 71. Therefore, in this step S103, the back surface 71b of the mask portion 71 is joined to the top portion 61c of the wall portion 61 throught the insulating layer 22. In this joining, for example, surface activation joining can be used.

Subsequently, as illustrated in FIG. 4(a), a metallization step is performed. That is, a mirror surface is formed on the semiconductor portion 54 by forming the metal film 31 on the side surface 14a of the semiconductor portion 54 using the shadow mask. 70 (step S104: third step). More specifically, the side surface 12b of the semiconductor portion 52 is masked by the first region 75 of the mask portion 71 and the wall portion 61 (more specifically, the wall portion 65 constituted of the wall portions 61 and 78) and the metal film 31 is formed on the side surface 14a in a state in which the side surface 14a is exposed from the opening portion 72 (metallization is performed). In the formation of the metal film 31, for example, sputtering can be used. In this case, a metal target is arranged on the surface 71a of the mask portion 71 and metal particles M are scattered toward the mask portion 71.

Thereby, the metal particles M are incident from the opening portion 72 and a metal material is deposited on the side surface 14a which is a metallized portion, so that the metal film 31 is formed. At this time, the metal material is also deposited on the side surface of the wall portion 61 at the side of the semiconductor portion 54 according to an incident direction of the metal particles M, so that the metal film 35 is formed. Likewise, the metal material is also partially deposited on the main surface 10s of the support substrate 10 and the metal film 36 is formed. On the other hand, because the side surface 12b of the semiconductor portion 52 which is a non-metallized portion is masked by the first region 75 of the mask portion 71 and the wall portion 61 (wall portion 65), the metal particles M do not reach it and the metal film is not formed. That is, the wall portion 61 (wall portion 65) functions as a shielding body of the metal particles M from the metal target. Also, an opening located on a non-movable portion of the actuator 13 is further provided in the mask portion 71 of the shadow mask 70. Accordingly, in step S103, simultaneously with the formation of the metal films 31 and 36, the metal material is also deposited on the non-movable portion of the actuator 13 and the metal film (not illustrated) is formed. As described above, this metal film is used as an electrode when a voltage is applied to the actuator 13 for generating an electrostatic force between comb teeth.

Subsequently, as illustrated in FIG. 4(b), the wall portion 61 is removed from the support substrate 10 and the shadow mask 70 is removed from the semiconductor layer S by etching the insulating layers 21 and 22 (sacrificial layer etching) (step S105: fourth step). In this step S105, for example, when the insulating layer 21 and the insulating layer 22 include a silicon oxide, it is possible to remove the insulating layer 21 between the wall portion 61 and the main surface 10s and remove the insulating layer 22 between the wall portion 61 and the wall portion 78 through etching using hydrofluoric acid and simultaneously remove the wall portion 61 arid the shadow mask 70.

Further, in this step, it is possible to remove the insulating layer 21 between the semiconductor portion 54 and the main surface 10s by etching the insulating layer 21 and form the movable mirror 14 in a state in which the semiconductor portion 54 floats over the main surface 10s. That is, in this step S105, the formation of the hollow structure (movable mirror 14) in the optical interferometer 1 and the removal of the wall portion 61 and the shadow mask 70 can be simultaneously performed.

Also, when the wall portion 61 peeled from the main surface 10s of the support substrate 10 remains within the optical interferometer 1, this may cause damage of an optical component, a movable component, or the like of the optical interferometer 1. Thus, when the wall portion 61 is removed in this step S105, the main surface 10s is directed to the bottom in a vertical direction and the wall portion 61 peeled from the main surface 10s (and the shadow mask 70 peeled from the semiconductor layer S) is considered to fall in a predetermined saucer A as illustrated in FIG. 5.

Here, viewpoints of the present inventors related to problems of the optical interferometer, etc. using MEMS technology will be described. The MEMS technology is based on high-precision alignment technology and high-precision structure formation technology using semiconductor photolithography technology and is useful as technology for manufacturing an optical interferometer, a diffraction grating, or the like configured to process light as waves. In particular, MEMS processing using the silicon substrate has many advantages. As an example of the advantages, the low cost of a material itself, good mechanical characteristics due to an excellent elastic material, the manufacturing of a highly reliable sensor or actuator, and the development of technology for forming a trench of a high aspect ratio to be substituted for tilted surface formation using the crystal anisotropy of a material or a Bosch process, etc. are included.

Thus, the MEMS technology may be used to manufacture an optical interferometer or the like for an acceleration sensor, a pressure sensor, a pixel mirror (DMD or the like) of a projector, and a Fourier transform infrared (FTIR) spectrometer. In particular, applications for the optical interferometer of the MEMS technology are wide and the optical interferometer of the MEMS technology is applied to optical coherent tomography (OCT), film thickness measurement, surface roughness measurement, etc. as well as FTIR spectroscopy and therefore is considered to implement the reduction of the size and cost of the above-described measuring devices.

Figure 6:
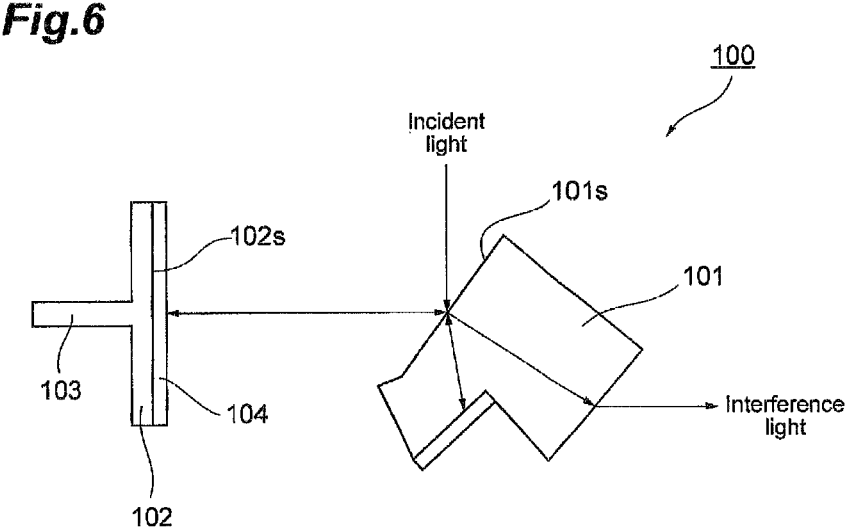
FIG. 6 is a diagram illustrating a problem occurring at the time of manufacturing an optical interferometer using MEMS technology.
Figure 7:
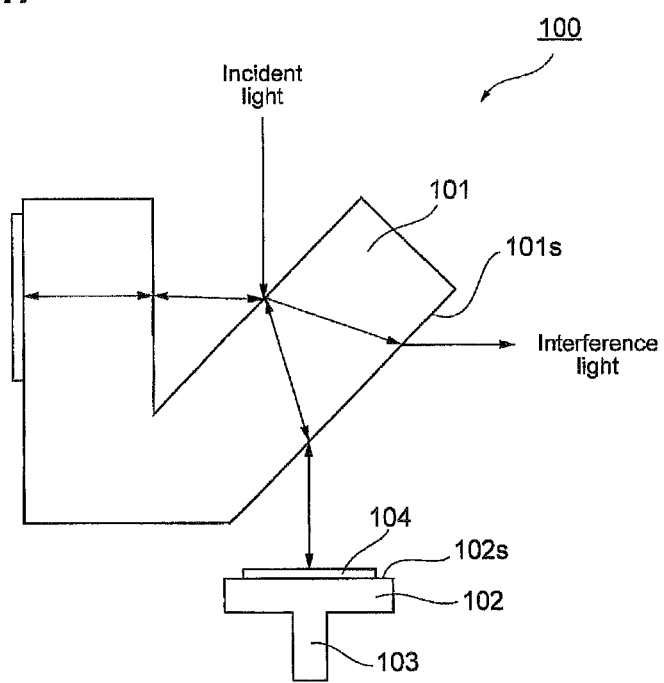
FIG. 7 is a diagram illustrating a problem occurring at the time of manufacturing the optical interferometer using MEMS technology.

However, when the optical interferometer using the MEMS technology is manufactured, the following problem may occur. That is as illustrated in FIGS. 6 and 7, when the optical interferometer 100 is manufactured, an optical component such as a beam splitter 101 or a movable mirror 102 and an actuator (drive portion) 103 for generating an optical path difference may be formed on the same substrate using photolithography and Si etching. In this case, because the optical interferometer 100 has an optical component which transmits light of the beam splitter 101 or the like, patterning is essential in metallization for the optical interferometer for improving optical use efficiency.

On the other hand, for example, because a side surface 102s of the movable mirror 102 serving as a target of formation of a metal film for configuring the mirror surface (that is, which is a metallized portion) is a side surface formed by Si etching, the formation of a pattern of a metal by the photolithography is difficult. Thus, the use of a metallization technique using a hard mask called the shadow mask is considered. However, in metallization using the shadow mask, it is necessary to increase a distance between a metallized portion and a non-metallized portion by increasing a distance between the beam splitter 101 and the movable mirror 102 to protect a side surface 101s of the beam splitter 101 (that is, a non-metallized portion) which is not the target of the formation of the metal film. Also, the side surface 101s of the beam splitter 101 is a half-mirror surface in FIG. 6 and a light transmission surface in FIG. 7, both of which are non-metallized portions.

Although the distance between the metallized portion and the non-metallized portion in the optical interferometer 100 determines the optical path length of the optical interferometer 100, the optical use efficiency is degraded by an extension of the optical path length because the optical interferometer formed by Si etching has a small optical effective size. Thus, there is a problem in that it is difficult to improve the optical use efficiency even when the metallization for the optical interferometer is performed in the metallization technique for the conventional optical interferometer. This problem will be described in further detail.

Figure 8:
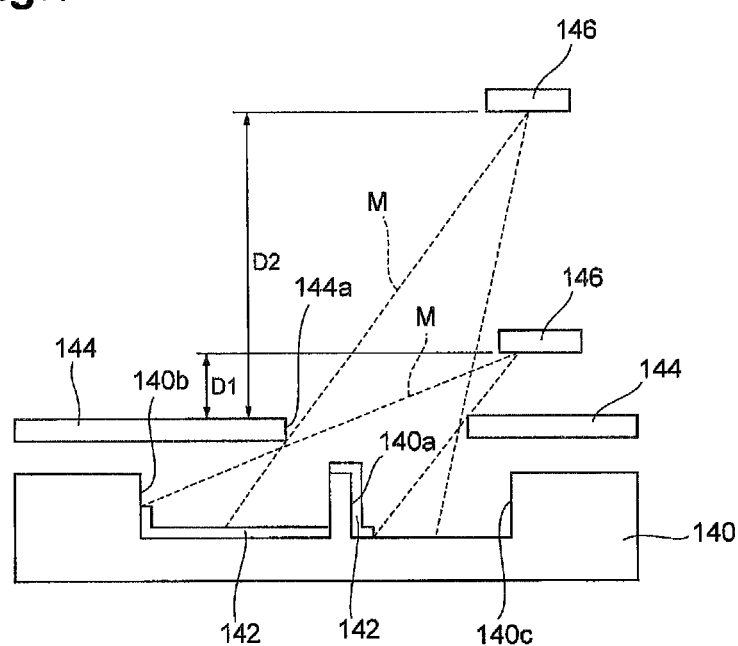
FIG. 8 is a diagram illustrating a problem occurring at the time of manufacturing the optical interferometer using MEMS technology.

FIG. 8 is a diagram illustrating an example of metallization using the shadow mask. In the metallization using a shadow mask 144 illustrated in FIG. 8, for example, it is considered that a distance between the shadow mask 144 and a metal target 146 is shortened from D2 to D1 and the horizontal-direction components of metal particles M from the metal target 146 is increased to form a uniform metal film 142 for a side surface 140a formed by Si etching. High-energy sputtering rather than resistance deposition or EB deposition is suitable for such metallization.

In this metallization, the side surface 140a located around an opening portion 144a of the shadow mask 144, for example, is a metallized portion serving as a mirror surface of a movable mirror and side surfaces 140b and 140c of both sides, for example, are non-metallized portions serving as half-mirror surfaces, light transmission surfaces, or the like. In this case, when the distance between the shadow mask 144 and the metal target 146 is reduced to D1 as described above, the metal film 142 is also formed on a part of the side surface 140b which is a nonmetallized portion. Accordingly, the side surface 140b is required to be away from the side surface 140a to prevent the metal film 142 from being formed on the side surface 140b.

On the other hand, according to a positional relationship in FIG. 8, the metal film is considered not to be formed on the side surface 140c. However, because a plurality of metallized portions are within an optical interferometer, a direction in which the metal particles M are directed becomes uniform by rotating the wafer 140 to uniformly form the metal film. That is, the metal film is actually formed even on the side surface 140c located at the side of the metal target 146 rather than the side surface 140a in FIG. 8. Accordingly, the side surface 140c is also required to be away from the side surface 140a to prevent the metal film from being formed on the side surface 140c. As described above, for example, even when the beam splitter and the movable mirror are not required to be away from each other according to an optical design of the optical interferometer, they are required to be away from each other because of the process design and a total optical path length of the optical interferometer is extended.

In the optical interferometer, light branched by the beam splitter should reach a final detector without loss along the way. To do this, it is ideally necessary to adopt an optical design in which propagation light is regarded as parallel light for an optical length. In general, when non-coherent light of a spectroscope or the like is handled, it is impossible to narrow a beam diameter of an incident beam to several μm to several tens of μm without loss. Consequently, a size of an incident window is generally set to several hundreds of μm or more. Light collected in the incident window of several hundreds of μm has a spread component for every angle and it is theoretically impossible to create parallel light having substantially the same beam diameter as that of the collected light according to an optical design.

For example, simultaneously when the beam diameter is enlarged to a multiple of m in a lens system in which image magnification is in, a spread angle of the beam (numerical aperture NA) is converted into 1/m. Because the creation of the parallel light indicates that the spread angle is reduced, it can be seen that it is only necessary to increase the image magnification m. In contrast, this indicates that it is not possible to generate parallel light having a smaller beam diameter from light having a predetermined spread angle in a certain diameter. For example, when light from an optical fiber having a core diameter of 200 μm and an NA of 0.2 is desired to be converted into parallel light having an NA of about 0.002 (a spread of about 2 μm in 1 mm), the beam diameter is 20 mm which is 100 times 2 μm.

Because a size of an optical surface formed by MEMS technology (for example, the above-described half-mirror surface or light transmission surface or the like) is 100 μm to about several hundreds of μm as an example, a major part of parallel light having a beam diameter of 20 mm is lost. As a result, because a decrease of a spread angle is limited, it is important to make the optical path length of the optical interferometer as short as possible to suppress the degradation of optical use efficiency by reducing the loss.

For the above-described problem, in a method of manufacturing the optical interferometer 1 according to the present embodiment, the wall portion 61 is arranged between the semiconductor portion 52 for the beam splitter 12 and the semiconductor portion 54 for the movable mirror 14. The metal film 31 is formed on the side surface 14a of the semiconductor portion 54 using the shadow mask 70 (metallization is performed). At the time of the metallization, the side surface 12b of the semiconductor portion 52 which is the non-metallized portion is masked using the wall portion 61 (wall portion 65) while the side surface 14a of the semiconductor portion 54 which is the metallized portion is exposed from the opening portion 72 of the shadow mask 70.

Thus, it is possible to form the mirror surface by forming the metal film 31 on the side surface 14a which is the metallized portion while preventing the metal film from being formed on the side surface 12b which is the non-metallized portion even when the semiconductor portion 52 and the semiconductor portion 54 are close to each other. Therefore, the extension of the optical path length in the optical interferometer 1 can be suppressed because the beam splitter 12 and the movable mirror 14 can be formed to be close to each other. Consequently, it is possible to manufacture the optical interferometer 1 capable of suppressing an increase of loss due to the extension of the optical path length and suppressing the degradation of optical use efficiency.

In addition, in the method of manufacturing the optical interferometer 1 according to the present embodiment, the semiconductor portions 52 to 54 are formed by etching the semiconductor layer formed on the main surface 10s of the support substrate 10 and the insulating layer and the wall portion 61 is formed in step S101. Thus, it is possible to collectively form the semiconductor portions 52 to 54 and the wall portion 61. In addition, it is possible to remove the wall portion 61 when the insulating layer 21 is etched to form the hollow structure such as the movable mirror 14 in step S105.

In addition, the wall portion 78 protruding from the back surface 71b is formed on the back surface 71b of the mask portion 71 and the bottom portion 78s of the wall portion 78 is joined to the top portion 61c of the wall portion 61 in step S103. Thus, the side surface 12b of the semiconductor portion 52 can be masked by the wall portion 65 constituted of the wall portion 61 and the wall portion 78. Consequently, because the height of the wall portion to be used in the mask of the side surface 12b can be further decreased than when the wall portion is formed on any one of the main surface 10s of the support substrate 10 and the shadow mask 70, the formation of the wall portion is facilitated.

Further, the insulating layer 22 is formed on the back surface 71b of the mask portion 71 and the back surface 71b of the mask portion 71 (more specifically, the bottom portion 78s of the wall portion 78) is joined to the semiconductor layer S via the insulating layer 22 in step S103. Thus, it is possible to easily remove the shadow mask 70 by etching the insulating layer 22. In particular, when the insulating layer 21 and the insulating layer 22 can be etched by the same etching agent, it is possible to simultaneously perform the formation of the hollow structure such as the movable mirror 14, the removal of the wall portion 61, and the removal of the shadow mask 70 through one etching process on the insulating layers 21 and 22.

The above-described embodiment has been described as an embodiment of a method of manufacturing the optical interferometer. Therefore, the method of manufacturing the optical interferometer according to aspects of the present invention is not limited to the above-described method. The method of manufacturing the optical interferometer according to aspects of the present invention can be arbitrarily changed within the scope in which the above-described method does not change the subject matter of each claim.

For example, in step S101, by etching the semiconductor layer formed on the main surface 10s of the support substrate 10 and the insulating layer, the semiconductor portions 52 to 54 are formed and the semiconductor portion (not illustrated) for the fixed mirror 15 and the third semiconductor portion (not illustrated) for the deflection mirrors 16 and 17 can be further formed on the main surface 10s and the insulating layer 21. Because the third semiconductor portion is a portion serving as the deflection mirrors 16 and 17, the third semiconductor portion includes side surfaces 16a and 17a tilted 45 degrees with respect to a direction orthogonal to the main surface 10s. Therefore, in this case, the etching of the semiconductor layer in step S101 may include a plurality of etching processes.

In addition, in step S101, the third wall portion (not illustrated) can be further formed by etching the semiconductor layer formed on the main surface 10s of the support substrate 10 and the insulating layer. The third wall portion is arranged between the third semiconductor portion and the semiconductor portion 52 so that the third wall portion extends in a direction along the main surface 10s and a direction orthogonal to the main surface 10s.

When the third wall portion is formed between the third semiconductor portion for the deflection mirror 16 and the semiconductor portion 52, the third wall portion is arranged between the side surface (third side surface) 16a of the third semiconductor portion at the side of the semiconductor portion 52 and the side surface 12a of the semiconductor portion 52 at the side of the third semiconductor portion. In this case, the third wall portion is used to separately protect the side surface 12a which is the non-metallized portion from the side surface 16a which is the metallized portion in a subsequent metallization step (step S104).

On the other hand, when the third wall portion is formed between the third semiconductor portion for the deflection mirror 17 and the semiconductor portion 52, the third wall portion is arranged between the side surface (third side surface) 17a of the third semiconductor portion at the side of the semiconductor portion 52 and the side surface 12b of the semiconductor portion 52 at the side of the third semiconductor portion. In this case, the third wall portion is used to separately protect the side surface 12b which is the non-metallized portion from the side surface 17a which is the metallized portion in a subsequent metallization step (step S104).

As described above, when the third semiconductor portion and the third wall portion are formed with the semiconductor portions 52 to 54 and the wall portion 61, the shadow mask 70 to be used in the metallization step can further include a second opening portion (not illustrated) formed in the mask portion 71. In step S103, the shadow mask 70 is arranged on the main surface 10s and the semiconductor layer S and joined to the semiconductor layer S so that the side surfaces 12a and 12b of the semiconductor portion 52 are masked by the mask portion 71 and the third wall portion and the side surfaces 16a and 17a of the third semiconductor portion are exposed from the second opening portion.

In step S104, the mirror surface is formed in the third semiconductor portion by further forming the metal films 33 and 34 on the side surfaces 16a and 17a of the third semiconductor portion using the shadow mask 70. More specifically, the side surfaces 12a and 12b of the semiconductor portion 52 are masked by the mask portion 71 and the third wall portion and the metal films 33 and 34 are formed (metallized) on the side surfaces 16a and 17a in a state in which the side surfaces 16a and 17a are exposed from the second opening portion. Thereafter, in step S105, the second wall portion is further removed. Also, the formation of the metal films 33 and 34 can be performed simultaneously with the formation of the metal film 31.

In such a manner, even when the third semiconductor portion for the deflection mirrors 16 and 17 is close to the semiconductor portion 52 for the beam splitter 12, the mirror surface can be formed by forming the metal films 33 and 34 on the side surfaces 16a and 17a which are metallized portions while preventing the metal film from being formed on the side surfaces 12a and 12b which are non-metallized portions. Therefore, because the beam splitter 12 can be formed to be close to the deflection mirrors 16 and 17, the extension of the optical path length in the optical interferometer can be further suppressed.

FIG. 9 is a schematic end view illustrating a modified example of a shadow mask illustrated in FIG. 3. As illustrated in FIG. 9(a), it is not necessary to form an insulating layer on an external surface of the mask portion 71 of the shadow mask 70. In this case, the bottom portion 78s of the wall portion 78 is directly joined to the top portion 61c of the wall portion 61 (without using the insulating layer), so that the shadow mask 70 can be joined to the semiconductor layer S.

In addition, as illustrated in FIG. 9(b), the wall portion 78 is not provided on the back surface 71b in the first region 75 of the mask portion 71 and only a protruding portion 71p may be provided. In this case, the back surface 71b in the first region 75 of the mask portion 71 is separated from the top portion 61c of the wall portion 61. In addition, the side surface 12b of the semiconductor portion 52 is masked by only the first region 75 of the mask portion 71 and the wall portion 61 (that is, without using the wall portion 78).

FIG. 10 is a schematic end view illustrating a modified example of the shadow mask illustrated in FIG. 3. As illustrated in FIG. 10, the shadow mask 70 may have a wall portion (first wall portion) 79 formed on the back surface 71b so that the shadow mask 70 extends along the back surface 71b of the mask portion 71 instead of the wall portion 78. When the shadow mask 70 is arranged on the main surface 10s and the semiconductor layer S, the wall portion 79 protrudes from the back surface 71b to reach the main surface 10s. In this case, the shadow mask 70 is arranged on the main surface 10s and the semiconductor layer S so that the wall portion 79 is arranged between the semiconductor portion 52 and the semiconductor portion 54 in step S103.

Thereby, the wall portion 79 extending along the main surface 10s is arranged between the side surface 12b of the semiconductor portion 52 and the side surface 14a of the semiconductor portion 54. The side surface 12b of the semiconductor portion 52 is masked by the wall portion 79 and the mask portion 71. That is, in this case, in step S101, the wall portion 61 for masking the side surface 12b is not formed.

As described above, as the wall portion for separately protecting the non-metallized portion such as the side surface 12b of the semiconductor portion 52 from the metallized portion such as the side surface 14a of the semiconductor portion 54, only a wall portion formed on the support substrate 10 (via the insulating layer 21) can be used like the wall portion 61, a wall portion formed on the shadow mask 70 like the wall portion 78 and the wall portion 61 can be used together, or only the wall portion formed on the shadow mask 70 can be used like the wall portion 79.

Also, even when the shadow mask 70 has the wall portion 79, the insulating layer 22 may be provided on an external surface as illustrated in FIG. 10(a) or no insulating layer may be provided as illustrated in FIG. 10(b). When the insulating layer 22 is provided, the bottom portion (bottom surface) 79s of the wall portion 79 is joined to the main surface 10s of the support substrate 10 via the insulating layer 22, so that the shadow mask 70 is supported on the main surface 10s. In this case, it is possible to remove the wall portion 79 (that is, the shadow mask 70) from the main surface 10s by removing the insulating layer 22 between the bottom portion 79s of the wall portion 79 and the main surface 10s.

On the other hand, when no insulating layer is provided, the shadow mask 70 is supported on the main surface 10s by joining the bottom portion 79s of the wall portion 79 to the insulating layer 21. In this case, it is possible to remove the wall portion 79 (that is, the shadow mask 70) from the main surface 10s by removing the insulating layer 21 between the bottom portion 79s of the wall portion 79 and the main surface 10s.

As described above, a method of manufacturing an optical interferometer according to the present embodiment includes the following aspects. That is, the shadow mask has a first wall portion formed on a back surface so that the shadow mask extends along the back surface of the mask portion and the shadow mask is arranged on the main surface so that the first wall portion is arranged between the first semiconductor portion and the second semiconductor portion in the second step. Therefore, the first wall portion extending along the main surface may be arranged between the first side surface of the first semiconductor portion and the second side surface of the second semiconductor portion.

At this time, the second insulating layer may be formed on the back surface of the mask portion and the bottom portion of the first wall portion may be joined to the main surface via the second insulating layer in the third step. In addition, in the third step, the bottom portion of the first wall portion may be joined to the main surface via the first insulating layer.

INDUSTRIAL APPLICABILITY

According to an aspect of the present invention, it is possible to provide a method of manufacturing an optical interferometer capable of suppressing the degradation of optical use efficiency due to an extension of an optical path length.

REFERENCE SIGNS LIST

1 Optical interferometer
10 Support substrate
10s Main surface
12 Beam splitter
14 Movable mirror
16, 17 Deflection mirror
21 Insulating layer (first insulating layer)
22 Insulating layer (second insulating layer)
31 Metal film (first metal film)
33, 34 Metal film (second metal film)
52 Semiconductor portion (first semiconductor portion)
12b Side surface (first side surface)
54 Semiconductor portion (second semiconductor portion)
14a Side surface (second side surface)
61 Wall portion (first wall portion)
61c Top portion
70 Shadow mask
71 Mask portion
71b Back surface
71p Protrusion portion
72 Opening portion (first opening portion)
78 Wall portion (second wall portion)
78s Bottom portion
79 Wall portion (first wall portion)

The invention claimed is:

1. A method of manufacturing an optical interferometer, the method comprising:
   a first step of forming a first semiconductor portion for a beam splitter and a second semiconductor portion for a movable mirror on a main surface of a support substrate formed of silicon and a first insulating layer formed on the main surface;
   a second step of disposing a first wall portion extending along the main surface between a first side surface of the first semiconductor portion at the side of the second semiconductor portion and a second side surface of the second semiconductor portion at the side of the first semiconductor portion;
   a third step of forming a mirror surface in the second semiconductor portion by forming a first metal film on the second side surface using a shadow mask; and
   a fourth step of removing the first wall portion after the third step,
   wherein the shadow mask has a mask portion and a first opening portion provided in the mask portion, and
   wherein, in the third step, the first side surface is masked by the mask portion and the first wall portion and the first metal film is formed in a state in which the second side portion is exposed from the first opening portion.

2. The method of manufacturing the optical interferometer according to claim 1, wherein, in the first step, the first and second semiconductor portions are formed by etching a semiconductor layer formed on the main surface and the first insulating layer and the second step is performed by forming the first wall portion on the main surface and the first insulating layer by the etching.

3. The method of manufacturing the optical interferometer according to claim 2, wherein, in the third step, the first side surface is masked by the mask portion and the first wall portion by joining a back surface of the mask portion to a top portion of the first wall portion.

4. The method of manufacturing the optical interferometer according to claim 3,
   wherein a second wall portion extending along the back surface is formed on the back surface of the mask portion, and
   wherein, in the third step, a bottom portion of the second wall portion is joined to the top portion of the first wall portion.

5. The method of manufacturing the optical interferometer according to claim 3,
   wherein a second insulating layer is formed on the back surface of the mask portion, and
   wherein, in the third step, the back surface of the mask portion is joined to the top portion of the first wall portion through the second insulating layer.

6. The method of manufacturing the optical interferometer according to claim 1,
   wherein, in the first step, a third semiconductor portion for a deflection mirror is formed on the main surface and the first insulating layer,
   wherein, in the second step, a third wall portion extending along the main surface is disposed between a third side surface of the third semiconductor portion at the side of the first semiconductor portion and the first semiconductor potion, and
   wherein, in the third step, a mirror surface is formed in the third semiconductor portion by forming a second metal film on the third side surface using the shadow mask, wherein the shadow mask has a second opening portion formed in the mask portion, and wherein, in the third step, a side surface of the first semiconductor portion at the side of the third semiconductor potion is masked by the mask portion and the third wall portion and the second metal film is formed in a state in which the third side surface is exposed from the second opening portion.

* * * * *